(12) United States Patent
Gupta et al.

(10) Patent No.: US 10,860,562 B1
(45) Date of Patent: Dec. 8, 2020

(54) DYNAMIC PREDICATE INDEXING FOR DATA STORES

(71) Applicant: Amazon Technologies, Inc., Reno, NV (US)

(72) Inventors: Anurag Windlass Gupta, Atherton, CA (US); Mengchu Cai, San Jose, CA (US); Andrew Scott Richardson, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 556 days.

(21) Appl. No.: 14/484,991

(22) Filed: Sep. 12, 2014

(51) Int. Cl.
*G06F 16/22* (2019.01)
*G06F 16/2453* (2019.01)

(52) U.S. Cl.
CPC ...... *G06F 16/2272* (2019.01); *G06F 16/2453* (2019.01)

(58) Field of Classification Search
CPC .................. G06F 17/30336; G06F 17/30442
See application file for complete search history.

(56) References Cited

U.S. PATENT DOCUMENTS

| | | | |
|---|---|---|---|
| 5,671,405 A | 9/1997 | Wu et al. | |
| 6,081,799 A | 6/2000 | Beavin et al. | |
| 6,345,266 B1 | 2/2002 | Ganguly et al. | |
| 6,571,233 B2 | 5/2003 | Beavin et al. | |
| 7,346,612 B2 | 3/2008 | Day et al. | |
| 7,966,315 B2 | 6/2011 | Okamoto et al. | |
| 8,560,584 B2 | 10/2013 | Gao et al. | |
| 8,626,745 B2 | 1/2014 | Okamoto et al. | |
| 8,700,876 B2 | 4/2014 | Shah et al. | |
| 8,914,354 B2 | 12/2014 | Au et al. | |
| 2004/0220972 A1* | 11/2004 | Bhattacharjee ... | G06F 17/30592 |
| 2007/0112736 A1* | 5/2007 | Okamoto ............ | G06F 17/3046 |
| 2009/0187542 A1* | 7/2009 | Begley .................. | G06F 16/907 |
| 2011/0093485 A1* | 4/2011 | Chang ............... | G06F 17/30935 707/759 |
| 2012/0143823 A1 | 6/2012 | Jain et al. | |
| 2012/0303633 A1* | 11/2012 | He .................... | G06F 17/30442 707/745 |
| 2014/0195542 A1 | 7/2014 | Larson et al. | |

(Continued)

OTHER PUBLICATIONS

U.S. Appl. No. 14/978,842, filed Dec. 22, 2015, Andrew Edward Caldwell, et al.

*Primary Examiner* — Etienne P Leroux
*Assistant Examiner* — Husam Turki Samara
(74) *Attorney, Agent, or Firm* — Robert C. Kowert; Kowert, Hood, Munyon, Rankin & Goetzel, P.C.

(57) ABSTRACT

A data store may implement dynamic query predicates for processing queries. Query predicate indexes may be maintained for individual storage locations in a data store. The query predicate indexes may indicate data values not stored in the storage location that satisfy a query predicate in the query predicate index. The query predicate index may be populated when queries are received at the data store which include new query predicates. When queries are received that include query predicates that correspond to query predicates in the query predicate index, the index values for each of the storage locations may be evaluated. Based, at least in part, on the evaluation, particular storage locations may be identified to read for servicing the queries.

20 Claims, 9 Drawing Sheets

(56) References Cited

U.S. PATENT DOCUMENTS

2015/0261615 A1* 9/2015 Peterson .............. G06F 3/0688
714/6.23
2015/0286682 A1* 10/2015 Ziauddin .......... G06F 16/24554
707/718

* cited by examiner

DYNAMIC PREDICATE INDEXING FOR DATA STORES

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data storage and data management.

Figure 1:
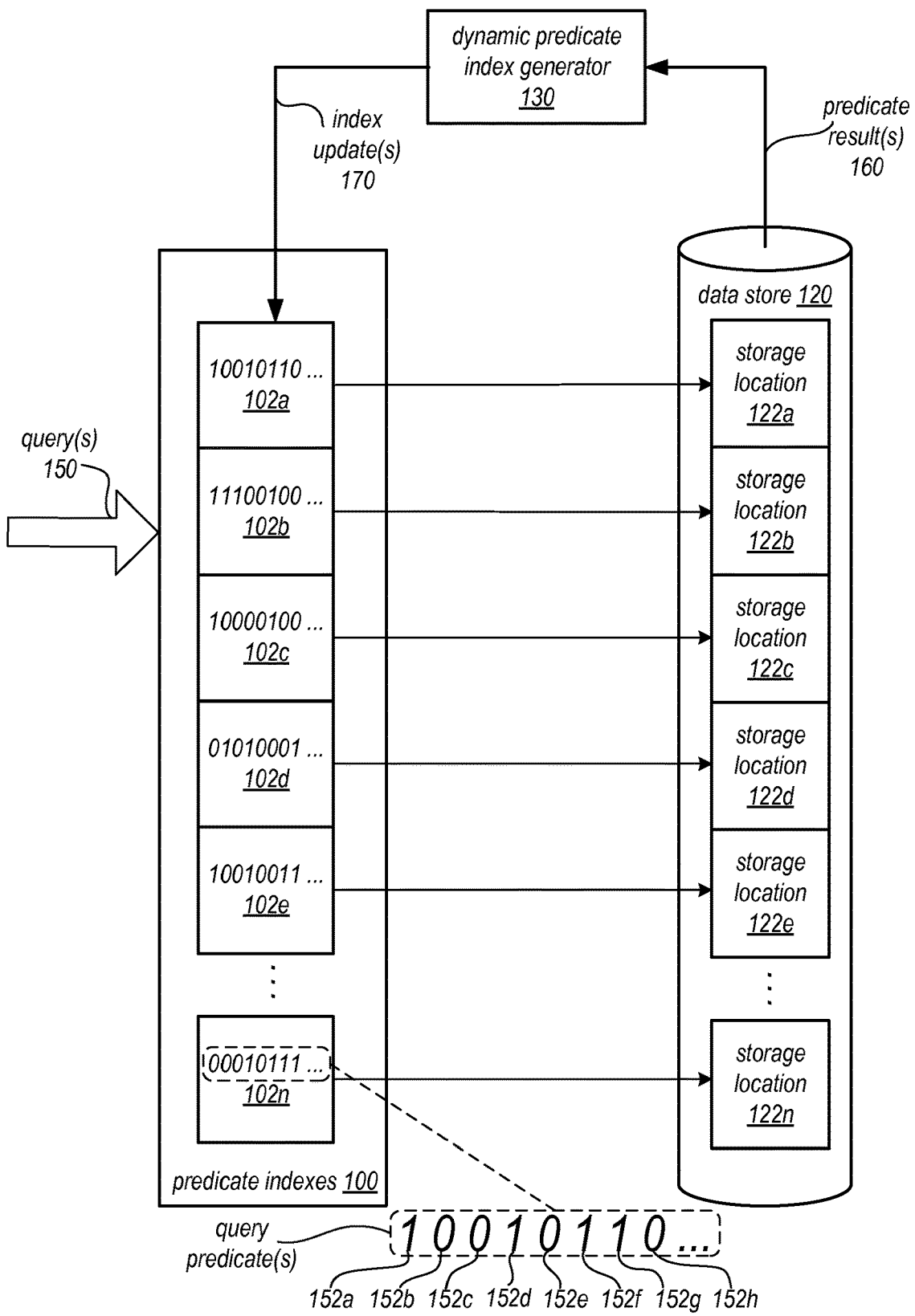
FIG. 1 illustrates a dataflow block diagram of dynamic predicate indexing for a data store, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments of dynamic predicate indexing for data stores are described herein. Managing data stored in data stores increases in complexity and operational cost as the amount of data stored in the data store increases. In order to provide more efficient access to data maintained in a data store for various workloads, such as analytics workloads, the indexing techniques may be implemented to organize the data, or instructing where certain data is located within underlying storage. B-trees, for instance, are a commonly implemented indexing technique for data stored in a relational database that organize data along a specified column to identify storage locations for specific query predicates. For example, a query predicate may be evaluated by walking/scanning the B-tree index to identify storage locations that may include data values that satisfy a query.

While many indexing techniques are commonly known, such as B-trees, such techniques are often costly in terms of operation and management. For example, a data store administrator may have to explicitly select which column or set of data to index upon. Moreover, significant processing overhead may be incurred when updating or adding data to the data store to update the index. Additionally, such indexes may consume significant amounts of storage to maintain, and are difficult to combine with other indexes to quickly union or intersect storage locations to be scanned to identify tuples of interest. Dynamic query predicate indexes may be implemented for data stores in order to remove administrative burdens for index. Query predicate indexes may be updated automatically as queries are received at a data store, in various embodiments, as discussed below, without any prior selection or specification of data to index (e.g., selecting a particular column). Any data that may be identified by a query predicate may be indexed, in various embodiments. Moreover, updating or adding data to the data store may allow for the query predicate indexes to lazily update (e.g., after results for the particular storage location have been determined). Query predicate indexes may be implemented in space efficient formats, such as bitmaps, which may consume significantly less storage space than traditional indexes, and be easily combined with other indexes through the use of Boolean operations (e.g., AND, OR).

FIG. 1 illustrates a dataflow block diagram of dynamic predicate indexing for a data store, according to some embodiments. Data store 120 may be a structured or semi-structured data store in various embodiments. For example, data store 120 may be a relational database or a non-relational database. Data may be stored for the data store in various storage locations 122a through 122n. A storage location 122 may be a defined location in which one or more data values for data store 120 are maintained. In at least some embodiments, storage locations 122 may represent data blocks or data pages.

Predicate indexes 100 may be implemented, in various embodiments, for storage locations 122 in order to identify which storage locations 122 do not store a data value that satisfies a query predicate (and thus do not need to be read when servicing a query that includes the query predicate). A respective predicate index 102 may be maintained for each individual storage location 122, in some embodiments. For example, predicate index 102a corresponds to storage location 122a, predicate index 102b corresponds to storage location 122b, etc. . . . Query predicate indexes 100 may be created when queries 150 are received for select data at data store 120 which are not currently indexed. For example, if a query includes a query predicate that is not listed or defined in mapping information for predicate indexes 100, then the storage locations 122 may each have to be evaluated in order to service the query. In some embodiments, multiple query predicates may be received that are not included in the query predicate index, but only select ones of the predicates may be added to the query predicate index. The results of reading the storage locations for the new query predicate 160 may be provided to dynamic predicate index generator 130 (or some other module or component) which may create new mapping information and respective index values for the new query predicate to update 170 each of the predicate indexes 102. For example, a new bit value may be added to a bitmap representing the query predicate index in some embodiments, which if not set may indicate that a data value that satisfies the new query predicate is not stored in the corresponding storage location 122. In at least some embodiments, predicate indexes 100 may be of fixed size (in order to maintain low cost index). As new query predicates are received in query(s) 150, predicates in the indexes 100 may be replaced with the new query predicates according to various replacement techniques, such as least recently used.

Thus, in various embodiments, the query predicates of previously received queries may be used to populate predicate indexes 100 for evaluating subsequent queries that include one or more matching query predicates. For example, if a query 150 is received query predicate index 102n may be evaluated. Corresponding query predicates in predicate indexes 100 may be identified for evaluation in various ways. For example, those query predicates that match (e.g., have the same set of data values identified, such as "gender=female") may be identified for evaluation. Query predicates included in an index may also correspond partially to an included query predicate (e.g., may be a larger set of data values than identified by the received query predicate, such as "sales>10,000" which includes "sales>15,000"). Query predicates in an index may also be combined to correspond to a new query (e.g., "5,000<units<10,000" may be identified in the combination of "units>2,500" and "units<13,000"). As noted above, in some embodiments, a query predicate index may be represented as a bitmap. For index 102, each bit may represent a different query predicate (which may be identified in mapping information and/or other metadata maintained for data store 120). For example, bit 152a may corresponding to one query predicate index in the index 102n, while bit 152 may correspond to a different query predicate in the index 102n, and so on. In some embodiments, a "0" bit, such as illustrated for bits 152b, 152c, 152e, and 152h, may indicate that a data value for the corresponding query predicate does not exist in storage location 122n. For those "1" bits, such as bits 152a, 152d, 152f, and 152g, queries including the corresponding query predicates may read storage location 122n in order to service the query.

Please note that the previous description of a data store, predicate query indexes is a logical illustration and thus is not to be construed as limiting as to the data store, storage locations or query predicate indexes.

This specification begins with a general description of a data warehouse service that implements dynamic predicate indexing for servicing queries. Then various examples of data warehouse, including different components/modules, or arrangements of components/module that may be employed as part of implementing the storage service are discussed. A number of different methods and techniques to implement dynamic predicate indexing are then discussed, some of which are illustrated in accompanying flowcharts. Finally, a description of an example computing system upon which the various components, modules, systems, devices, and/or nodes may be implemented is provided. Various examples are provided throughout the specification.

It is not uncommon for clients (or customers, organizations, entities, etc.) to collect large amounts of data which may require subsequent storage or management. Although some clients may wish to implement their own data management system for this data, it is increasingly apparent that obtaining data management services may prove a more efficient and cost effective option for those clients who do not wish to manage their own data. For example, a small business may wish to maintain sales records and related data for future data analysis. Instead of investing directly in the data management system to maintain the data, and the expertise required to set up and maintain the system, the small business may alternatively find it more efficient to contract with a data management service to store and manage their data.

Figure 2:
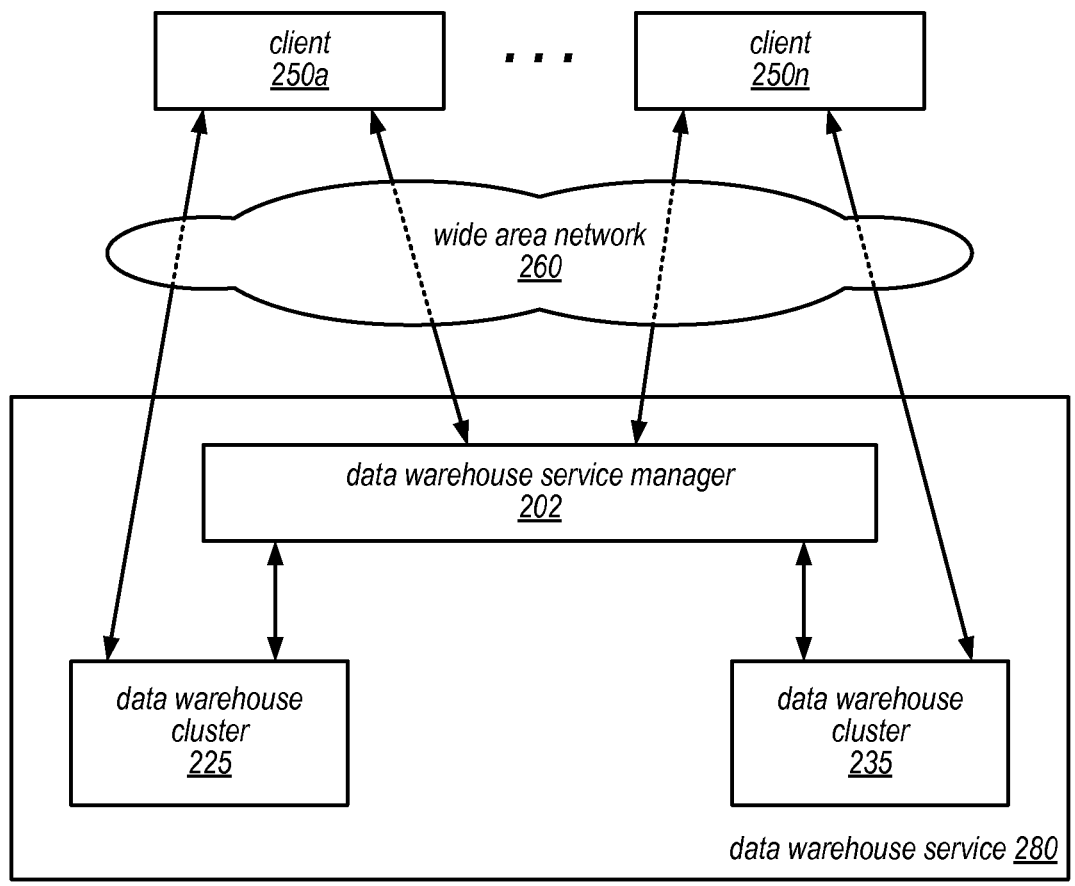
FIG. 2 is a block diagram illustrating an example distributed data warehouse service that implements dynamic predicate indexing, according to some embodiments.

A data management service, such as a distributed data warehouse service discussed below with regard to FIGS. 2 through 4, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system. However, various versions of the components discussed below as related to implementing dynamic predicate indexing may be equally configured or adapted to implement embodiments for various other types of relational database systems, such as row-oriented database systems. Therefore, the following examples are not intended to be limiting as to various other types or formats of relational database systems. Similar techniques may also be implemented for other types of storage systems, whether structured or semi-structured which may not be implemented as a data warehouse.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data). For example, for database operations that only need to access and/or operate on one or a small number of columns at a time, less memory space may be required than with traditional row-based storage, since only data blocks storing data in the particular columns that are actually needed to execute a query may be retrieved and stored in memory. To increase the efficiency of implementing a columnar relational database table, a multi-column index may be generated to indicate the data values likely stored in data blocks storing data for the indexing columns of a columnar relational database table, which may be used to determine data blocks that do not need to be read when responding to a query.

As discussed above, various clients (or customers, organizations, entities, or users) may wish to store and manage data using a data management service. FIG. 2 illustrates an example distributed data warehouse system that may provide data management services to clients, according to some embodiments. Specifically, distributed data warehouse clusters may respond to store requests (e.g., to write data into storage) or queries for data (e.g., such as a Server Query Language request (SQL) for select data), along with many other data management or storage services.

Multiple users or clients may access a distributed data warehouse cluster to obtain data warehouse services. Clients which may include users, client applications, and/or data warehouse service subscribers), according to some embodiments. In this example, each of the clients 250a through 250n is able to access distributed data warehouse cluster 225 and 235 respectively in the distributed data warehouse service 280. Distributed data warehouse cluster 225 and 235 may include two or more nodes on which data may be stored on behalf of the clients 250a through 250n who have access to those clusters.

A client, such as clients 250a through 250n, may communicate with a data warehouse cluster 225 or 235 via a desktop computer, laptop computer, tablet computer, personal digital assistant, mobile device, server, or any other computing system or other device, such as computer system 1000 described below with regard to FIG. 9, configured to send requests to the distributed data warehouse clusters 225 and 235, and/or receive responses from the distributed data warehouse clusters 225 and 235. Requests, for example may be formatted as a message that includes parameters and/or data associated with a particular function or service offered by a data warehouse cluster. Such a message may be formatted according to a particular markup language such as Extensible Markup Language (XML), and/or may be encapsulated using a protocol such as Simple Object Access Protocol (SOAP). Application programmer interfaces (APIs) may be implemented to provide standardized message formats for clients, such as for when clients are communicating with distributed data warehouse service manager 202.

Clients 250a through 250n may communicate with distributed data warehouse clusters 225 and 235, hosted by distributed data warehouse service 280 using a variety of different communication methods, such as over Wide Area Network (WAN) 260 (e.g., the Internet). Private networks, intranets, and other forms of communication networks may also facilitate communication between clients and distributed data warehouse clusters. A client may assemble a message including a request and convey the message to a network endpoint (e.g., a Uniform Resource Locator (URL)) corresponding to the data warehouse cluster). For example, a client 250a may communicate via a desktop computer running a local software application, such as a web-client, that is configured to send hypertext transfer protocol (HTTP) requests to distributed data warehouse cluster 225 over WAN 260. Responses or other data sent to clients may be formatted in similar ways.

In at least some embodiments, a distributed data warehouse service, as indicated at 280, may host distributed data warehouse clusters, such as clusters 225 and 235. The distributed data warehouse service 280 may provide network endpoints to the clients 250a to 250n of the clusters which allow the clients 250a through 250n to send requests and other messages directly to a particular cluster. As noted above, network endpoints, for example may be a particular network address, such as a URL, which points to a particular cluster. For example, client 250a may be given the network endpoint "http://mycluster.com" to send various request messages to. Multiple clients (or users of a particular client) may be given a network endpoint for a particular cluster. Various security features may be implemented to prevent unauthorized users from accessing the clusters. Conversely, a client may be given network endpoints for multiple clusters.

Distributed data warehouse clusters, such as data warehouse cluster 225 and 235, may be made up of one or more nodes. These clusters may include different numbers of nodes. A node may be a server, desktop computer, laptop, or, more generally any other computing device, such as those described below with regard to computer system 1000 in FIG. 9. In some embodiments, the number of nodes in a data warehouse cluster may be modified, such as by a cluster scaling request. Nodes of a data warehouse cluster may implement one or more data slices for storing data. These data slices may be part of storage devices, such as the disk storage devices discussed below with regard to FIGS. 3 and 4. Clusters may be configured to receive requests and other communications over WAN 260 from clients, such as clients 250*a* through 250*n*. A cluster may be configured to receive requests from multiple clients via the network endpoint of the cluster.

In some embodiments, distributed data warehouse service 280 may be implemented as part of a network-based service that allows users to set up, operate, and scale a data warehouse in a cloud computing environment. The data warehouse clusters hosted by the network-based service may provide an enterprise-class database query and management system that allows users to scale the clusters, such as by sending a cluster scaling request to a cluster control interface implemented by the network-based service. Scaling clusters may allow users of the network-based service to perform their data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, sub-queries, and aggregation, more efficiently.

In various embodiments, distributed data warehouse service 280 may provide clients (e.g., subscribers to the data warehouse service provided by the distributed data warehouse system) with data storage and management resources that may be created, configured, managed, scaled, and terminated in response to requests from the storage client. For example, in some embodiments, distributed data warehouse service 280 may provide clients of the system with distributed data warehouse clusters composed of virtual compute nodes. These virtual compute nodes may be nodes implemented by virtual machines, such as hardware virtual machines, or other forms of software implemented to simulate hardware configurations. Virtual nodes may be configured to perform the same tasks, functions, and/or services as nodes implemented on physical hardware.

Distributed data warehouse service 280 may be implemented by a large collection of computing devices, such as customized or off-the-shelf computing systems, servers, or any other combination of computing systems or devices, such as the various types of devices described below with regard to FIG. 9. Different subsets of these computing devices may be controlled by distributed data warehouse service manager 202. Distributed data warehouse service manager 202, for example, may provide a cluster control interface to clients, such as clients 250*a* through 250*n*, or any other clients or users who wish to interact with the data warehouse clusters managed by the distributed data warehouse manager 202, which in this example illustration would be distributed data warehouse clusters 225 and 235.

For example, distributed data warehouse service manager 202 may generate one or more graphical user interfaces (GUIs) for storage clients, which may then be utilized to select various control functions offered by the control interface for the distributed data warehouse clusters hosted in the distributed data warehouse service 280.

Figure 3:
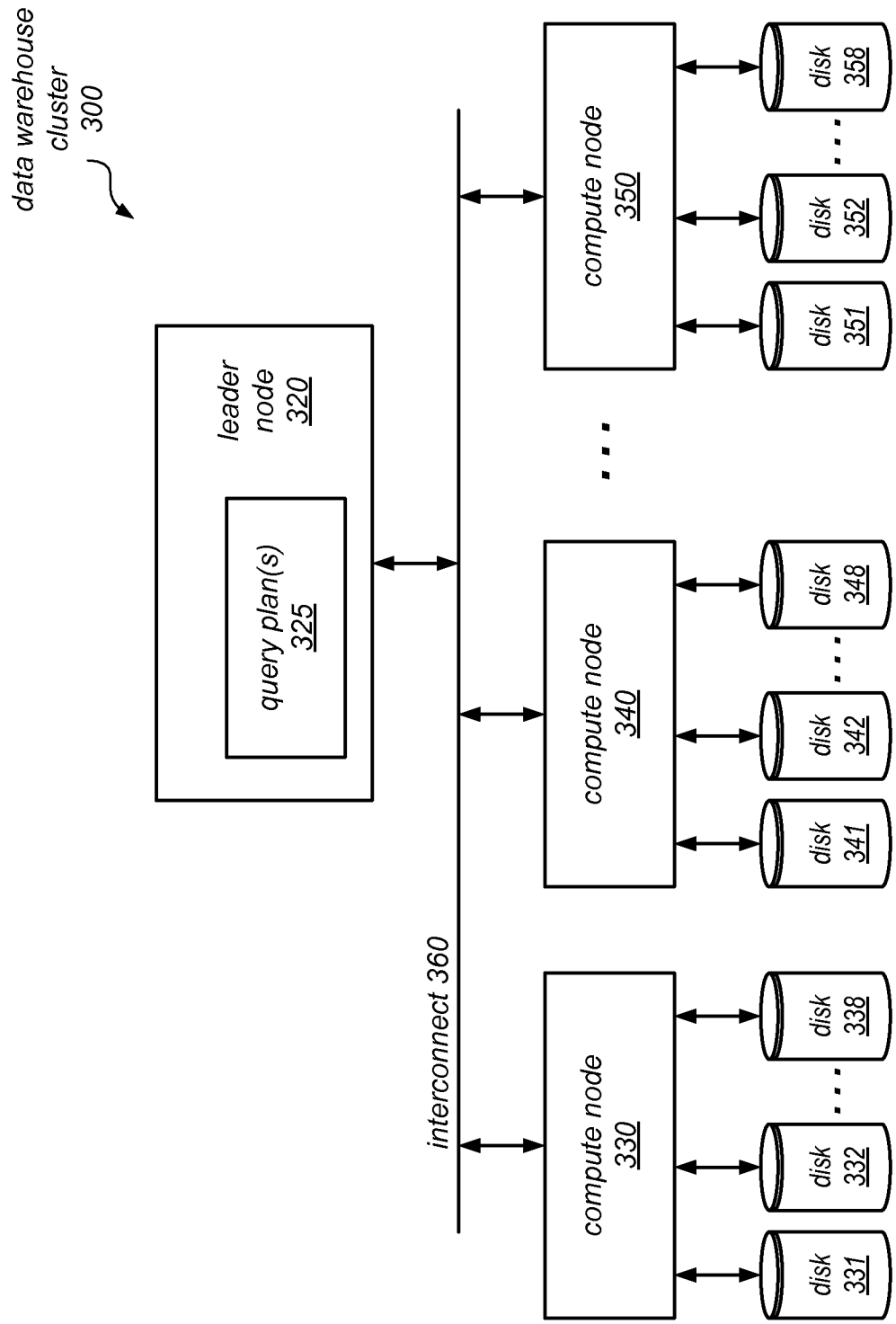
FIG. 3 is a block diagram illustrating an example distributed data warehouse cluster, according to some embodiments.

FIG. 3 is a block diagram illustrating a distributed data warehouse cluster in a distributed data warehouse service, according to one embodiment. As illustrated in this example, a distributed data warehouse cluster 300 may include a leader node 320 and compute nodes 330, 340, and 350, which may communicate with each other over an interconnect 360. Leader node 320 may generate and/or maintain one or more query plans 325 for executing queries on distributed data warehouse cluster 300. As described herein, each node in a distributed data warehouse cluster may include multiple disks on which data blocks may be stored on behalf of clients (e.g., users, client applications, and/or distributed data warehouse service subscribers). In this example, compute node 330 includes disks 331-338, compute node 340 includes disks 341-348, and compute node 350 includes disks 351-358. In some embodiments, a component of the distributed data warehouse cluster (or the distributed data warehouse system of which it is a component) may support load balancing, using any of a variety of applicable load balancing techniques. For example, in some embodiments, leader node 320 may include a load balancing component (not shown).

In at least some embodiments, distributed data warehouse cluster 300 may be implemented as part of the web based data warehousing service, such as the one described above, and includes a leader node 320 and multiple compute nodes, such as compute nodes 330, 340, and 350. The leader node 320 may manage communications with storage clients, such as clients 250*a* through 250*n* discussed above with regard to FIG. 2. For example, a leader node may be a server that receives requests from various client programs (e.g., applications) and/or subscribers (users), then parses them and develops an execution plan (e.g., query plan(s) 325) to carry out the associated database operation(s). More specifically, the leader node may develop the series of steps necessary to obtain results for complex queries and joins. Leader node 320 may also manage the communications among compute nodes 330 through 350 instructed to carry out database operations for data stored in the distributed data warehousing cluster 300. For example, compiled code may be distributed by leader node 320 to various ones of the compute nodes 330 to 350 to carry out the steps needed to perform queries, and intermediate results of those queries may be sent back to the leader node 320. Leader node 320 may receive data and query responses or results from compute nodes 330, 340, and 350. A database schema and/or other metadata information for the data stored among the compute nodes, such as the data tables stored in the cluster, may be managed and stored by leader node 320.

Distributed data warehousing cluster 300 may also include compute nodes, such as compute nodes 330, 340, and 350. These one or more compute nodes (sometimes referred to as storage nodes), may for example, be implemented on servers or other computing devices, such as those described below with regard to computer system 1000 in FIG. 9, and each may include individual query processing "slices" defined, for example, for each core of a server's multi-core processor. Compute nodes may perform processing of database operations, such as queries, based on instructions sent to compute nodes 330, 340, and 350 from leader node 320. The instructions may, for example, be compiled code from execution plan segments and steps that are executable by the particular data compute node to which it is sent. Data compute nodes may send intermediate results from queries back to leader node 320 for final aggregation. Each data compute node may be configured to access a certain memory and disk space in order to process a portion of the workload for a query (or other database operation) that is sent to one or more of the compute nodes 330, 340 or 350. Thus, compute node 330, for example, may access disk 431, 432, up until disk 438.

Disks, such as the disks 331 through 358 illustrated in FIG. 3, may be may be implemented as one or more of any type of persistent storage devices and/or storage system suitable for storing data accessible to the data compute nodes, including, but not limited to: redundant array of inexpensive disks (RAID) devices, disk drives or arrays of disk drives such as Just a Bunch Of Disks (JBOD), (used to refer to disks that are not configured according to RAJD), optical storage devices, tape drives, RAM disks, Storage Area Network (SAN), Network Access Storage (NAS), or combinations thereof. In various embodiments, disks may be formatted to store columnar database tables through various column-oriented database schemes.

In some embodiments, each of the compute nodes in a distributed data warehouse cluster may implement a set of processes running on the node server's (or other computing device's) operating system that manage communication with the leader node, e.g., to receive commands, send back data, and route compiled code to individual query processes (e.g., for each core or slice on the node) in order to execute a given query. In some embodiments, each of compute nodes includes metadata for the blocks stored on the node. In at least some embodiments this block metadata may be aggregated together into a superblock data structure, which is a data structure (e.g., an array of data) whose entries store information (e.g., metadata about each of the data blocks stored on that node (i.e., one entry per data block). In some embodiments, each entry of the superblock data structure includes a unique ID for a respective block, and that unique ID may be used to perform various operations associated with data block. For example, indications of column-specific compression techniques applied to the data stored in the data block, indications of default compression techniques applied to the data stored in the data block, or probabilistic data structures that indicate data values not stored in a data block may all be stored in the respective entry for a data block. In some embodiments, the unique ID may be generated (and a corresponding entry in the superblock created) by the leader node or by a computing node when the data block is first written in the distributed data warehouse system. In at least some embodiments, an entry in the superblock may be maintained that indicates the query predicate indexes for entries stored in the superblock.

Figure 4:
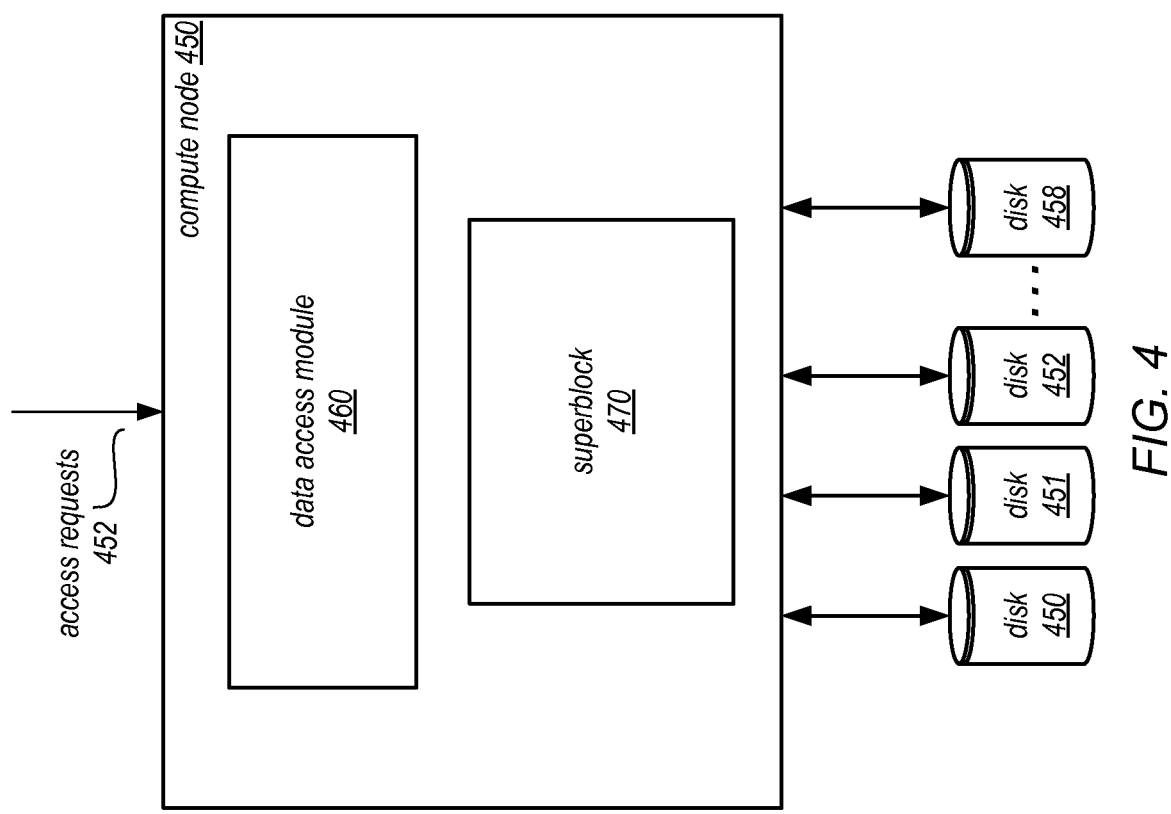
FIG. 4 is a block diagram illustrating an example compute node, according to some embodiments.

FIG. 4 illustrates an example of a compute node, according to some embodiments. Access requests 452, such as the various queries and messages sent to a leader node, such as leader node 320, and sent from a leader node to a compute node, may be received at compute node 450. A data access module 460, such as described in further detail below with regard to FIG. 5, may process access requests, directing reads, writes, and other access operations to disks 450 through 458. Various different hardware and software devices may be used singly or in combination to implement query execution module 460. When processing queries, data access module 460 may examine the entries query predicate index values in the superblock 470 for each data block storing data for the database table to identify data blocks to be read in order to service the query, and then read the identified data blocks storing data for the column.

In some embodiments, a compute node 450 may also include a superblock data structure 470, such as the superblock data structure described above, stored locally at the compute node or stored remotely, but accessible to the compute node, which may include respective entries for the data blocks stored on the compute node 450 which store block metadata including query predicate indexes, as well as other information, for the data blocks. Note, however, that in some embodiments, metadata for data blocks may be stored in multiple different locations, such as in the data block itself, or in in other individual data structures. Therefore, the superblock data structure 470 is not intended to be limiting as to the various other structures, locations, methods, or techniques which might be applied to preserve metadata information for the data block.

Figure 5:
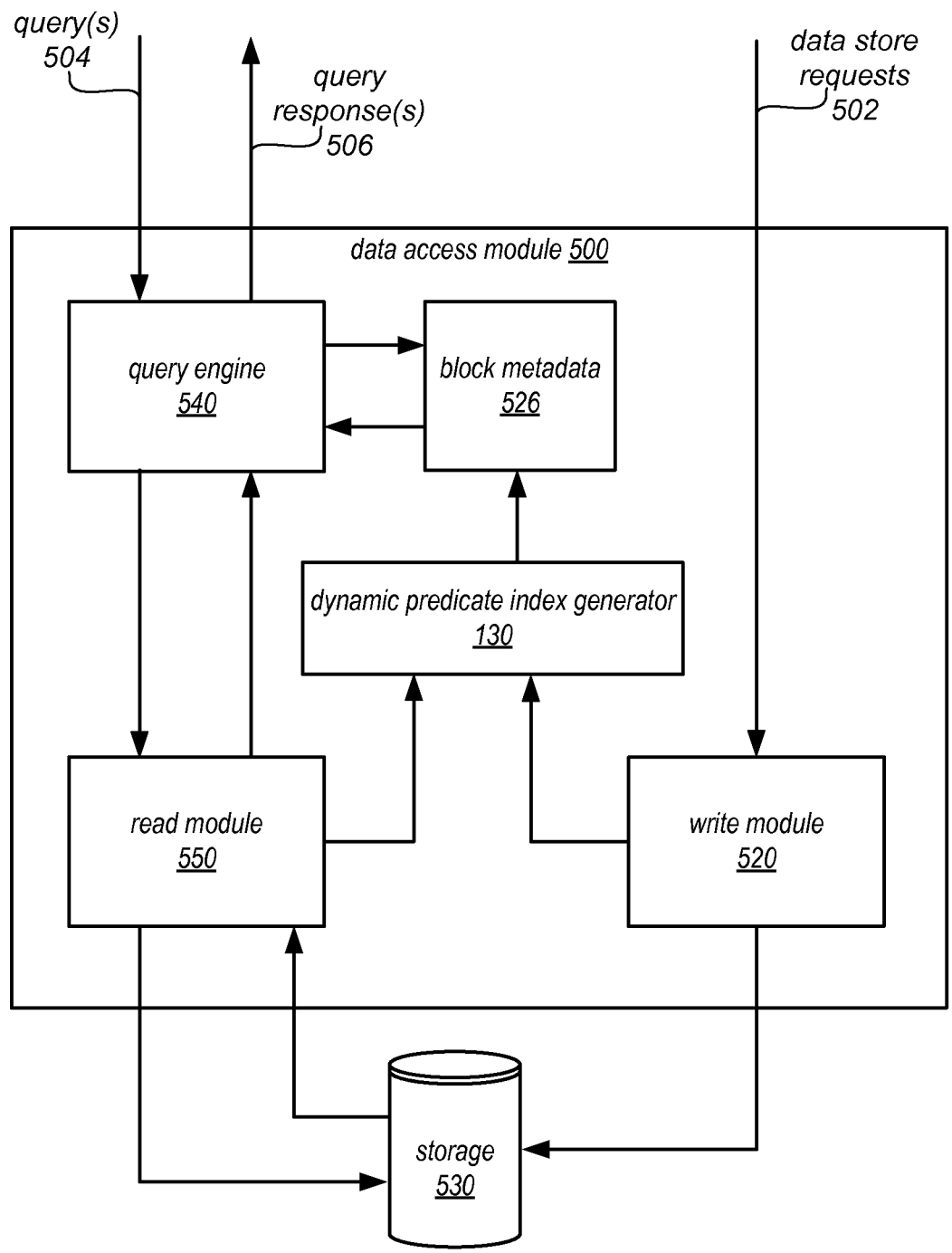
FIG. 5 is a block diagram illustrating an example data access module that implements processing queries according to a query predicate index, according to some embodiments.

As discussed above, a compute node may be configured to receive access requests, such as queries, storage operations, and other data management operations. FIG. 5 is a block diagram illustrating an example data access module that implements processing queries according to a query predicate index, according to some embodiments. Queries 504 and data store requests 502, or indications of queries or data store requests, may be received as inputs to data access module 500. Data access module 500 may communicate with storage 530, which may store a plurality of data blocks for multiple columns of a columnar database table. Data for the multiple columns may be stored in the data blocks in storage 530, and data access module 500 may be configured to both store this data and read this data from storage.

Portions or all of data access module 500 may be implemented on a compute node, such as compute node 450 described above with regard to FIG. 4. Although depicted in as implemented in a compute node in FIG. 4, data access module 500, or components or modules of data access module 500, such as dynamic predicate index generator 130 may be implemented in leader node 320, described above with regard to FIG. 3, or some other component or module of the data warehouse service. Various different configurations of hardware and software components may be used to implement the data access module 500 as well as the components or modules illustrated within. Also note that, although different modules or components are illustrated within data access module 500 as one or more distinct modules or devices, these various components may be combined together, located differently, or alternatively configured to implement dynamic predicate indexing for data stores, and therefore, the following description of FIG. 5 is not intended to be limiting as to the various other ways a data access module or similar module or device may be implemented.

Data store requests 502 which may include data to be stored for a columnar relational database table stored in storage 530. For example, the data for storage in a data block in storage 530 may be obtain the data via an Open Database Connectivity (ODBC) and/or Java Database Connectivity (JDBC) driver interface or other component that is configured to receive storage request information and data for storage. Dynamic predicate index generator 130 may receive as input the data to be stored for the database table in storage 530 from write module 520.

Figure 8:
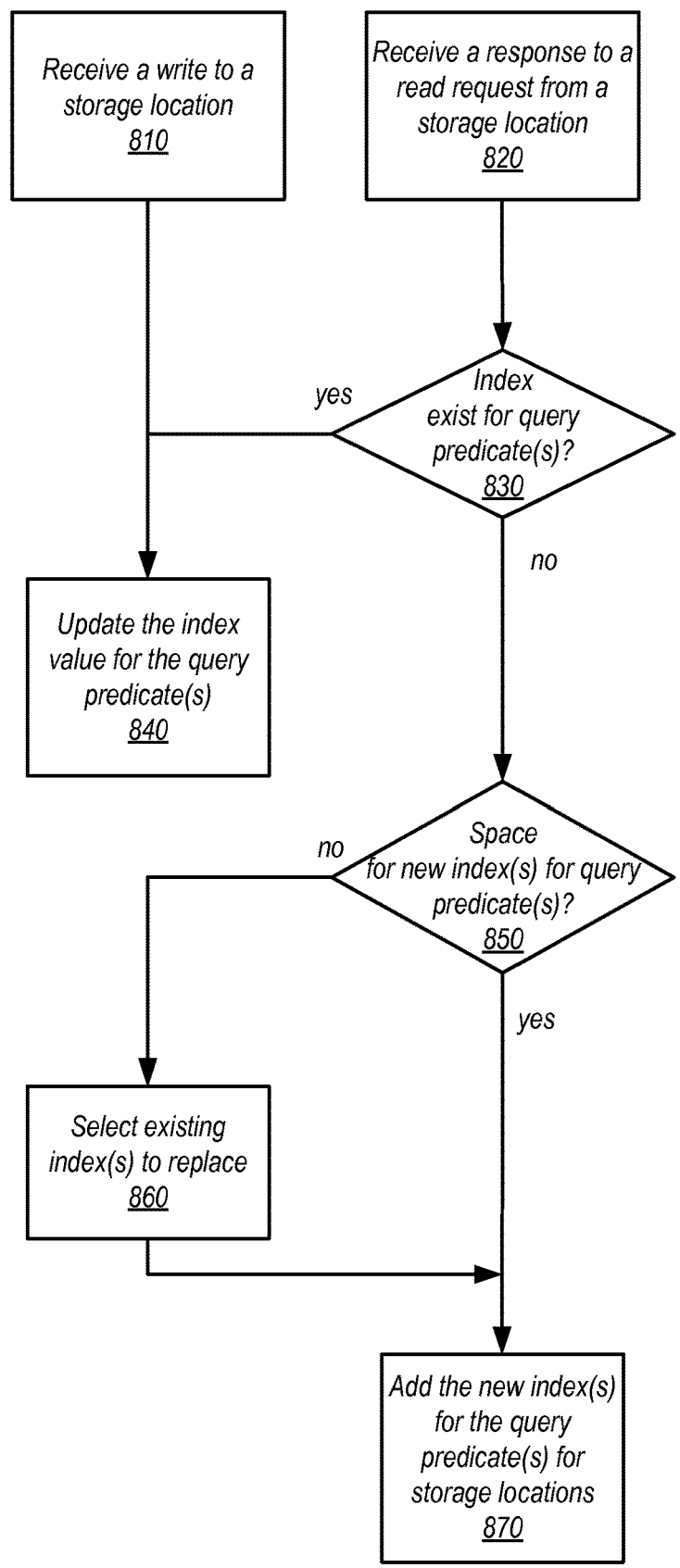
FIG. 8 illustrates a high-level flowchart of a method to update a query predicate index, according to some embodiments.

Dynamic predicate generator 130 may store, update, or send predicate index values generated/modified for the columnar relational database table to block metadata 526 may be aggregated metadata for the blocks in storage 530, such as the superblock data structure 470 described above with regard to FIG. 4. Thus bitmaps or other representations of the query predicate indexes for individual data blocks in storage 530 may be updated according to the storage requests 502 received. FIG. 8, discussed below, provides various examples of techniques for updating query predicate indexes dynamically, which dynamic predicate index generator 130 may implement in various embodiments.

A write module 520 may also be implemented by data access module 500 to store the data for data blocks in the data blocks in storage 530. In at least some embodiments, write module 520 may be configured to sort the entries of the columnar relational database table according to primary key values for each respective entry and direct the storage 530 to store the columnar relational database table according the sorted order. In some embodiments, write module 520 may be configured to update block metadata 526 with other metadata for the data stored in the data block.

Data access module 500 may also receive queries 504, or indications of queries, such as queries for select data stored in storage 530. For example, a leader node, such as leader node 320 described above with regard to FIG. 3, may receive a query from a storage client, and generate a query execution plan which sends the query to a compute node implementing data access module 500. Data access module 500 may implement a query engine 540 to process and receive the queries. As discussed above queries may be instructions to be executed according to a query plan, but may also be more generally any type of request for data that meets a specified criterion or is generated by a specified process. In some embodiments, a query, or an indication of a query, may include one or more predicates that identify select data for processing the query. For example, an SQL query may include predicates that specify conditions to be met for data to be retrieved, such as "WHERE customer='small' AND customer='medium'." In some embodiments, there may different types of queries. Some types of query predicates may require filtering on point values (e.g., all records where the state value="Texas"). Other predicates may request larger groups of data, such as range predicates that filter data based on a range of data values (e.g., all purchase orders for with purchase prices between $1,000 and $10,000). Some queries may indicate data joins that join records from one table in database based on a corresponding value obtained from another database. (e.g., join the records from of a personal database that includes an indication of a particular work department with those records of employee personal information that include the same work department). As query engines 540 are well-known to those of ordinary skill in the art, the previous description is not intended to be limiting as to the many different techniques and implementations of a query engine. For example, a standard query engine configured to process standard database protocol messages, such as SQL requests, may be implemented, or alternatively, a query engine that processes customized queries, such as those specified by an API may be used.

Figure 6:
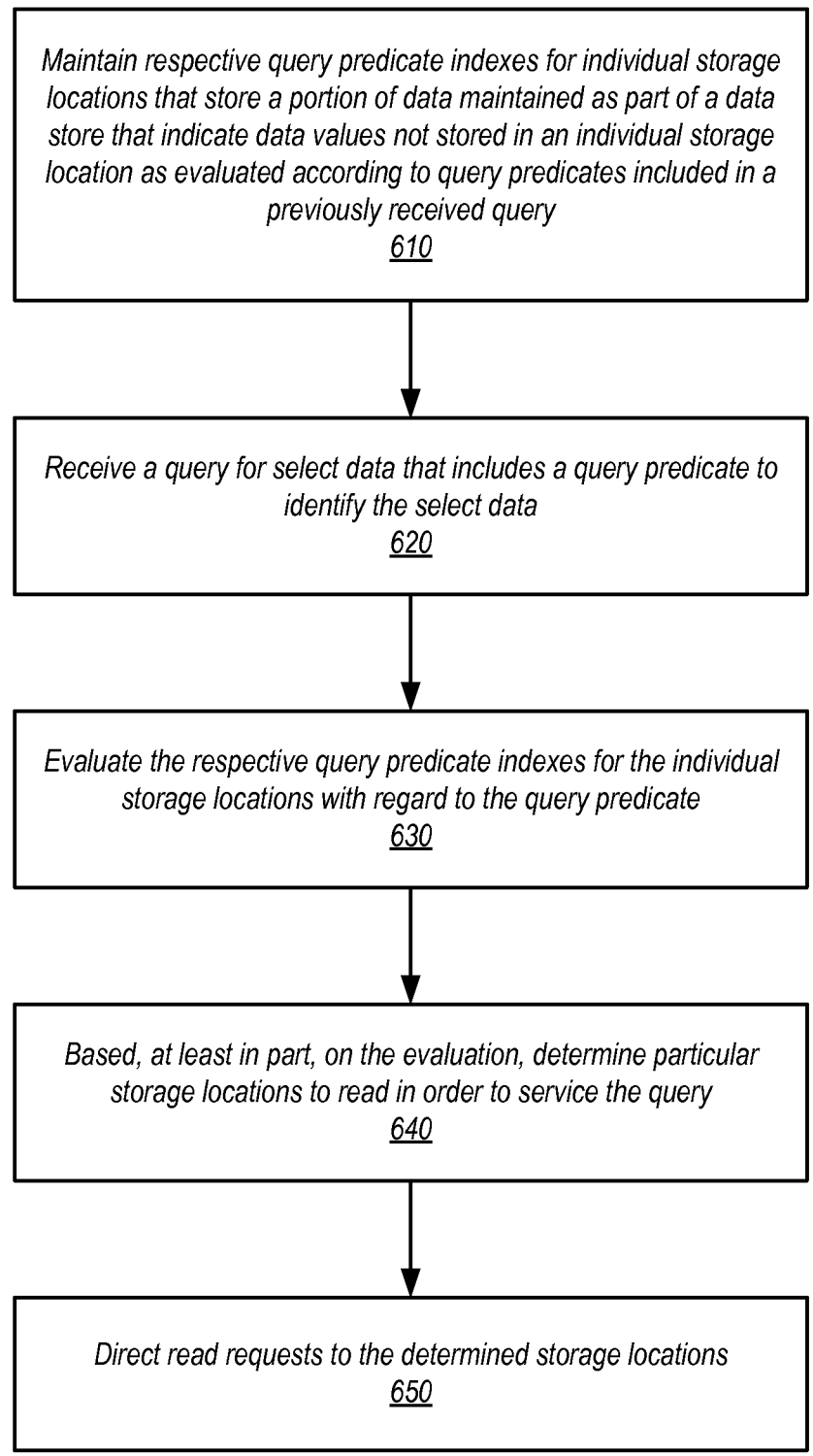
FIG. 6 is a high-level flowchart illustrating a method to process queries according to a query predicate index, according to some embodiments.
Figure 7:
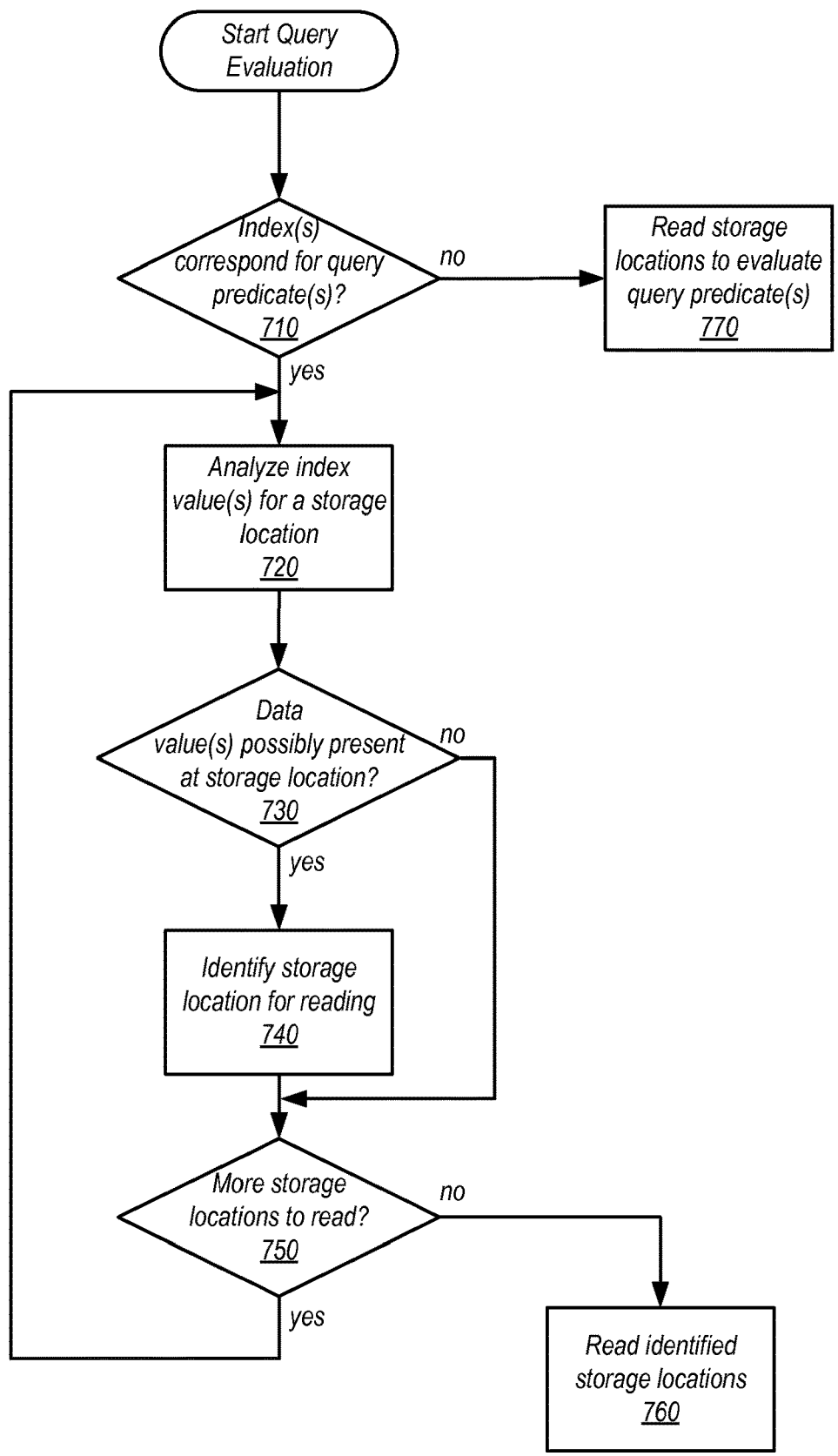
FIG. 7 illustrates a high-level flowchart of a method to evaluate query predicates with respect to query predicate indexes, according to some embodiments.

In some embodiments, therefore, a query engine 520 may receive an indication of a query 504 including one or more query predicates for the columnar relational database table in storage 530 for select data. Query engine 540 may evaluate the query to identify query predicates which may be included in the query predicate index. For example, query engine 540 may scan bitmaps or other representations of query predicate indexes stored in block metadata 526 to determine which data blocks to read for servicing a query based on the query predicates included in the query. If, for instance the query includes 3 different query predicates, then block metadata 526 may be accessed to evaluate query predicate indexes for those 3 different query predicates. The index values for the 3 different query predicates may be evaluated for the data blocks in 530. If, for instance a bit for any of the 3 queries for a particular data block is set to "0" (indicating that a data value for that satisfies the query predicate is not in the data block), then the data block need not be accessed. Thus, in some embodiments, index values may be used to identify data blocks to be read when servicing the query. FIGS. 6 and 7, discussed in further detail below, describes some of the various methods and techniques that may be used to process queries using dynamic predicate indexes, and therefore the above example is not intended to be limiting. Query engine 540 may then direct read module 550 to read the identified data blocks storing data for the columnar relational database table in order service the query.

In at least some embodiments, data access module 500 may include read module 550. Read module 550 may perform read operations to obtain data from storage 530. In some embodiments, read module 550 may be directed by query engine 540 to read certain data blocks for a column of the columnar relational database table and return the read data to query engine 540 for further processing. Query engine 540 may then provide at least some of the data in a query response 506 to a storage client, leader node, or other requesting system or device, or process, filter, manipulate, or otherwise change the data read from storage 530 in accordance with the received query. In at least some embodiments, read module 550 may also transfer data read from storage 530 to a database cache (not illustrated) or other module or device part that provides storage for more frequently accessed data when processing queries 504. Query engine 540 may then access the cache or other module with requesting new read operations of the read module 550. As a variety of different caching techniques for data management and storage systems are well-known to those of ordinary skill in the art, the previous examples are not intended to be limiting.

As illustrated in FIG. 5, read module 550 may provide results of the read request to dynamic predicate index generator 130. If one or more of the query predicates for the query is new, dynamic predicate index generator 130 may create new index values for the data blocks of storage 530 to indicate those data blocks that do not store data that satisfies the new query predicate (for data blocks where it is unknown, or positively known that the data values exist, the index may be set to indicate that the data blocks should be read for processing a subsequent query including the new query predicate). FIG. 8, discussed below, provides various examples of updating and or creating new values for query predicates in response to the results of read requests. In some embodiments, replacement techniques may be implemented to select which query predicates may be maintained in query predicate indexes (e.g., based on use).

While FIGS. 2 through 5 have been described and illustrated in the context of a data warehouse service implementing a column-oriented relational database, the various components illustrated and described in FIGS. 2 through 5 may be easily applied to other data management systems that provide data management and/or storage services for a relational database table, which may include various other data formats, such as a row-oriented relational database. As such, FIGS. 2 through 5 are not intended to be limiting embodiments in a data warehouse cluster, nor limiting a description of a data storage and management cluster. Moreover, the data warehouse service is provided as an example of a data store which may implement query predicate indexing, which may also be implemented for a variety of other different data stores. Different types of structured or semi-structured data models may be implemented at these different data stores, each of which may be indexed using a query predicate index.

FIG. 6 is a high-level flowchart illustrating a method to process queries according to a query predicate index, according to some embodiments. Various different systems and devices may implement the various methods and techniques described below, either singly or working together. For example, a data access module implementing a query predicate index generator, such as dynamic predicate index generator 130 described above with regard to FIGS. 1 and 5, and a query engine, such as query engine 540, may be configured to implement the various methods. Alternatively, a combination of different systems and devices, such as the multiple compute nodes illustrated in FIG. 3 working together, for example, may also perform the below method and techniques, as well as a leader node 320, also illustrated in FIG. 3. Therefore, the above examples and or any other systems or devices referenced as performing the illustrated method, are not intended to be limiting as to other different components, modules, systems, or configurations of systems and devices.

As indicated at 610, respective query predicate indexes for individual storage locations storing a portion of data maintained as part of a data store may be maintained. The respective query predicate index may indicate which data values are not stored in an individual storage location as evaluated according to query predicates included in a previously received query, in some embodiments. For example, a previous query predicate that identifies "employees WHERE salary >100,000" may be mapped to an index value in the query predicate index. An index value for each storage location may indicate whether or not the storage location should be read to possibly retrieve data values that satisfy the query predicate (e.g., employees with salaries >100,000). For those storage locations not indicated to be read, it may be determined that a data value that satisfies the query predicate is not stored in the storage location.

The size of a query predicate index may be fixed or limited to a particular number of query predicates or may be increased as needed to store additional query predicates, in some embodiments. Query predicate indexes may be stored in various formats for efficient indexing. For example, in at least some embodiments, query predicate indexes may be represented as a bitmap. Each storage location may have a respective bitmap indicating whether a storage location should be read in order to service a query including the query predicates in the query predicate index. For example, a "1" may be stored to indicate that the storage location should be read, whereas a "0" may indicate that a data value is not stored in the storage location that satisfies the corresponding query predicate. Utilizing bitmaps a large number of query predicates may be indexed for a particular storage location efficiently (e.g., a 100 byte index may provide 800 predicate bits). Mapping information and/or other metadata may be maintained describing the query predicate, and the corresponding index value in the query predicate index (e.g., predicate "X<Y", bitmap offset 37). Updates to the underlying data, or additional data may be added to the bitmap for a storage location, performing simple binary operations to flip the bit values to "1" or "0" respectively.

As indicated at 620, a query may be received for select data of the data store that includes one (or more) query predicates to identify the select data. Queries for data may be formatted in many different ways as may be acceptable to the type of data store. For example, structured query language (SQL) queries may be received for data stores implementing relational databases, in some embodiments. Query predicates may generally provide an evaluation of particular data such that the particular data can be identified to satisfy or not satisfy the query predicate, and thus be included in the select data (if meeting all other included query predicates). As indicated at 630, the respective query indexes for the individual storage locations may be evaluated with regard to the query predicate included in the query, in various embodiments. Query predicates included in the index may be evaluated to identify matching or other corresponding query predicates. For example, as noted above one or more query predicates may partially correspond to the predicates included in the query. If, for instance, the predicates included in the query include "number of purchases>10" AND "gender=male" AND "zipcode=12345", then query predicates in the index that identify "gender=male" AND "zipcode=12345" may be identified for evaluation for the received query (even though no query predicate in the index exists for "number of purchases." Similarly, a single query predicate included in the index may identify a larger set of data values than the predicate in the query (e.g., "X>300" may include "X>400"). Thus, the single query predicate may be identified for evaluation in the query predicate index. FIG. 7, discussed below, provides various examples of methods and techniques for evaluating query predicate indexes.

As indicated at 640, based, at least in part on the evaluation of the query predicate indexes, particular storage locations to read in order to service the query may be identified. In at least some embodiments, additional indexing techniques may be implemented for the data store. Thus, storage locations identified for reading may be further identified based on the additional indexing techniques (e.g., primary or secondary indexes on particular columns in a database table). Similarly, query predicate indexes may be incorporated into other indexing techniques. For example, a b-tree index may be maintained for identifying storage locations for data in some embodiments. As part of the branch locations in the b-tree index, query predicate indexes may be maintained that combine (e.g., a Boolean OR of query indexes represented as bitmaps) the query predicate indexes for the leaf storage locations beneath the branch location. As traversal operation is performed, moving along the various branches of the b-tree, the storage locations may be evaluated based on the identified query predicates to be evaluated. If the combined query predicate index at the branch location indicates that none of the leaf locations beneath the branch location need to be read in order to service the query, then no further traversals beneath the storage branch may be performed.

Query predicate indexes may allow for indexing on any type of data in the data store. Thus, in some embodiments, query predicate indexes may include indexes on data not included in another predetermined index for the data store (e.g., not in a primary or secondary indexing column). Read requests may then be directed to the determined storage locations, as indicated at 650. As discussed in FIG. 8 below, results of the read requests may be used to update the query predicate index dynamically, or to add results for a new query predicate to be included in the query predicate index.

Different types of data stores may implement query predicate indexes. For example, in some embodiments various kinds of structured data stores, such as relational databases, may implement query predicate indexes. Semi-structured data stores, such as non-relational databases, may also implement query predicate indexes. Underlying data may be sorted or arranged as well. For example, in some embodiments, a database implementing dynamic predicate indexing may be sorted along a particular column, with query predicate indexes that include query predicates evaluating different columns in the database. As the underlying data is changed (e.g., modified, added to, or removed), the query predicate index structure may be dynamically adjusted. FIG. 8, discussed below, provides for the details for dynamically adjusting query predicate indexes, in some embodiments.

FIG. 7 illustrates a high-level flowchart of a method to evaluate query predicates with respect to query predicate indexes, according to some embodiments. As indicated at 710, a query may be first evaluated to determine whether an index exists for query predicates included in the query, in some embodiments. For example, mapping information and/or other metadata may be evaluated to detect whether query predicates included in the query correspond (e.g., are inclusive of the query predicate) to query predicates included in the query predicate index. If at least one of the query predicates included in the query predicate index does not correspond, then storage locations in the data store may be read to evaluate the non-indexed query predicates, as indicated at 770. In some embodiments, all storage locations may be read if a query predicate is not included in the query predicate index. However, in at least some embodiments, other indexes/techniques may be used to select a subset of storage locations to read for servicing the query. For instance, the data store may be a relational database that implements an index upon a primary key, which may be used to further identify storage locations to be read for servicing the query.

If index(s) do exist for query predicate(s), as indicated by the positive exit from 710, then the query predicate index for each of the storage locations may be evaluated. The mapping information and/or other metadata may be analyzed to identify which index values correspond to the existing query predicates. As noted above, one or more query predicates in the index may partially or combination correspond to a query predicate in the query. As indicated at 720, the index values for a particular storage location may be analyzed. For instance, the corresponding index values of the identified query predicates in in a bitmap representing the query predicate index for the storage location may be checked to see whether the storage location should be read (e.g., if a "1" is the data value, then the storage location should be read—but if a "0" then the storage location should not be read as a data value that satisfies the query predicate is not indicated to be in the storage location). If the index value for each of the query predicate(s) being analyzed indicates that the storage location should be read, as indicated by the positive exit from 730, then the storage location may be identified for reading, as indicated at 740. If not, then a new evaluation may be performed for more possible storage locations to read that have not yet been evaluated (as indicated by the positive exit from 750). Once the index values for the possible storage locations to read have been evaluated, then as indicated by the negative exit from 750, the identified storage locations may be read, as indicated by 760.

The way in which new data is stored or changes are performed may vary from data store to data store. The effect of new data or changes to data upon query predicate indexes implemented for the data store may also differ. In some embodiments, new data or changes to data may reset the query predicate index to indicate that the corresponding new or changed storage location should be read. Responses to read requests may also be evaluated to update the dynamic index predicate, in some embodiments. FIG. 8 illustrates a high-level flowchart of a method to update a query predicate index, according to some embodiments.

As indicated at 810, a write may be received to update a storage location, in various embodiments. A write request may modify or change a value for a storage location that already stores data. For example, the write request may be a request to update or change data in a particular record in a relational database table (e.g., change a value in specific column in the particular record). The write request may, in some embodiments, be an insert or other operation to add additional data to new storage locations. New rows, records, columns, or other data objects or structures may be added to the data maintained as part of the data store.

In response to receiving the write request, the index value for query predicate(s) may be updated for the storage location, as indicated at 840. For example, the index value for the storage location may be updated to indicate that the storage location should be read for all query predicates indicate in the dynamic query predicate index, in some embodiments. All bits, for instance, in a bitmap for a particular data block may be set to "1" in order to indicate that the data block should be read as possibly including a value that satisfies the query predicates. In some embodiments, a data value in the storage location after the application of the write request (e.g., the new or modified data values) may be evaluated according to each of the query predicates included in the query predicate index. If the data value now included in the storage location satisfies 3 of the 50 query predicates included in the query predicate index, for instance, then the respective bits for those query predicates may be set to "1" in the bitmap (leaving other bits for the remaining query predicates set to "0" indicating that the data values in the storage location do not satisfy the query).

Query predicate indexes may also be updated or created as a result of read requests, in some embodiments. As indicated at 820, a response to a read request made to a storage location may be received. For example, a large number of storage locations may read in order to service a query (as discussed above with regard to FIG. 6). The results of the read requests may be returned and evaluated according to the query predicate(s) included in the query. If, as indicated by the positive exit from 830, an index for one or more of the query predicates included in the query request exists in the query predicate index, then the query predicate index for the storage location may be updated, as indicated 840. Similar to the discussion above with regard to the write request, the index may be updated based on an evaluation of data values within the storage location according to the query predicate. If the data values do satisfy the query predicate, then the query predicate index for the storage location may be updated to indicate that the storage location should be read when retrieving data to service a query including the query predicates. A bit for the query predicate in a bitmap representing the query predicate index, for instance, may be set to "1" to indicate that the storage location should be read.

If an index for at least one of the query predicates does not exist, as indicated by the negative exit from 830, then it may be determined whether or not to add an index value to the query predicate index for the at least one query predicate. The query predicates included in the query predicate index may be dynamically adjusted. For example, in some embodiments, the query predicate index may be set at a fixed size (e.g., containing space for 1,000 query predicates). If the query predicate index is full (e.g., holding 1,000 query predicates), then one of the current query predicates included in the index may be replaced for the at least one query predicate. For example, as indicated by the negative exit from 850, an existing query predicate index to replace may be selected if no space exists to add the at least one query predicate to the query predicate index, in some embodiments, as indicated at 860. Selecting a query predicate index to replace may be performed in various ways. For example, various types of least recently used (LRU) techniques may be implemented to replace indexes according to how often they are utilized for servicing queries. Other replacement schemes, such as implementing based on time (e.g., first-in-first-out) may be used to discard older query predicates, in some embodiments.

However selected, the new index for the at least one query predicate may be added for storage locations in the data store, as indicated at 870 in various embodiments. For example, the at least one query predicate may be mapped to the selected index to be replaced, updating the various mapping information and other metadata that describes the query predicate. In at least some embodiments, multiple new query predicates may be included in a query, but only some of the new query predicates may be added to the index. For example, only 2 of 3 predicates in a received query may be dominate (e.g., discriminatory) such that future queries may include similar predicates. Thus, the 2 query predicates may be added to the index, while the 3rd predicate may not. In some embodiments, based on the results of the read request for each storage location the index may be updated to indicate whether data values in the storage location include a data value that satisfies the at least one query predicate. For those storage locations which may not be evaluated, the index may be updated to indicate that the storage location should be read if evaluated the query predicate. For example, bits in a bitmap representing the query predicate index may be set to "1" for each storage location known to include data values that satisfy the query, or for those storage locations for which it is unknown (e.g., storage locations that have not been read/evaluated). Those storage locations which have been read a may be positively identified as not including a data value that satisfies the query predicate may be updated to indicate that the storage location should not be read (e.g., a "0" value placed in the bitmap representing the index for the storage location).

In some embodiments, space for new indexes may exist (without removing currently included query predicates) as indicated by the positive exit from 850, and thus the new index for the query predicate may be added, as indicated at 870. Mapping information or and other metadata that describes the query predicate may be updated to include the new query predicate. As discussed above, based on the results of the read request for each storage location the index may be updated to indicate whether data values in the storage location include a data value that satisfies the at least one query predicate. For those storage locations which may not be evaluated, the index may be updated to indicate that the storage location should be read if evaluated the query predicate.

Adding to or updating query predicate indexes may allow for the dynamic adjustment the query predicates included in the index over time based on the queries received at the data store. In this way, a storage manager or administrator need not select which indexes to create on which data (e.g., indexes on particular columns). Instead, the query predicate indexes may automatically adjust based on query patterns and other access behavior of the data store. The techniques described above with regard to FIGS. 6-8 may be implemented to provide query predicate indexes that adjust in response to the behavior of clients/users of the data store. For example, drill-down queries, where successive queries select subsets of data returned in previous queries may, in various embodiments, be efficiently processed, as storage locations to service the query may be easily identified based on a results for a prior query predicate stored in the query predicate index.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may be configured to implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of dynamic predicate indexing as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 9:
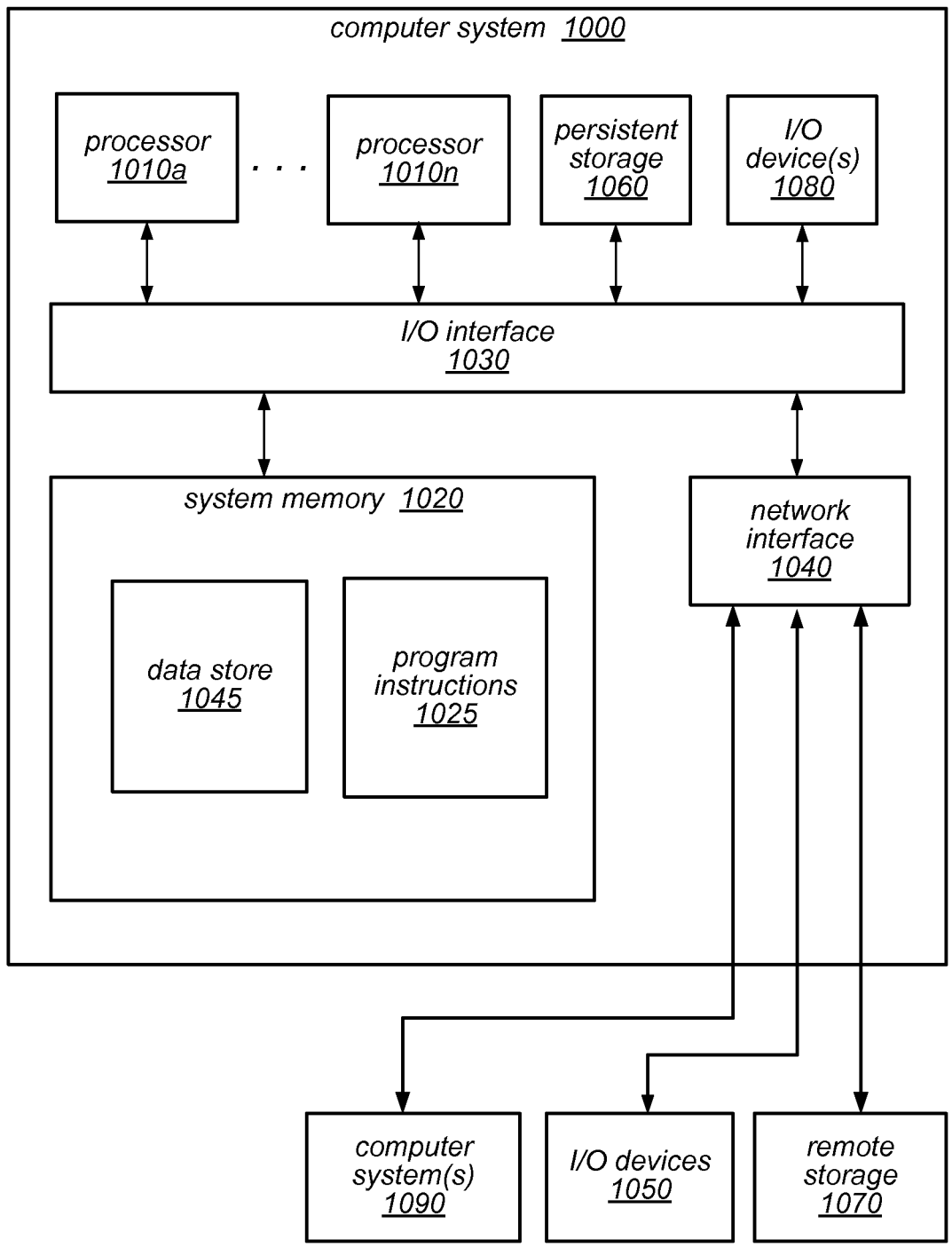
FIG. 9 illustrates an example system configured to implement the various methods, techniques, and systems described herein, according to some embodiments.

As shown in FIG. 9, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
at least one block-based persistent storage device that comprises a plurality of data blocks for a table in a data store, wherein individual ones of the plurality of data blocks store data values of a plurality of data records of the table;
at least one processor;
a system memory that comprises program instructions that when executed by the at least one processor cause the at least one processor to implement:
a dynamic predicate index generator, configured to:
maintain respective query predicate indexes for individual ones of the plurality of data blocks, wherein each of the respective query predicate indexes is associated with a set of one or more query predicates and indicates that data values satisfying at least some of the one or more query predicates are not stored in a corresponding data block as evaluated according to one or more query predicates included in a previous query directed to the table;
in response to a determination that a received query includes a new query predicate that does not exist in one of the query predicate indexes, dynamically add the new query predicate to the one query predicate index; and
in response to a determination that no space exists in the one query predicate index for the new query predicate, dynamically remove an existing query predicate from the one query predicate index;
a read module;
a query engine, configured to:
receive a query directed to the data store for select data from the table, wherein the query comprises at least one predicate to identify the select data;
in response to the receipt of the query:
evaluate each of the respective query predicate indexes for the individual ones of the plurality of data blocks with regard to the at least one predicate, wherein the at least one predicate corresponds to one of the one or more query predicates included in the query predicate indexes;
determine, based at least in part on the evaluation, a particular one or more of the plurality of data blocks to read, wherein individual ones of the particular one or more data blocks are determined to possibly store data values of data records that satisfy the at least one predicate;
direct the read module to read the particular one or more data blocks from storage in order to service the query; and
filter data values of data records in individual ones of the particular one or more data blocks read by the read module according to the at least one predicate to generate a response to the query.

2. The system of claim 1,
wherein the query engine is further configured to:
receive another query directed to the data store for other select data from the table, wherein the other query comprises another predicate that does not correspond to the one or more query predicates;

direct the read module to read another one or more of the plurality of data blocks in order to service the other query; and wherein the dynamic predicate index generator is further configured to update the respective query predicate indexes for the individual ones of the plurality of data blocks to include an indication that data values satisfying the other predicate are not stored in the other one or more data blocks as evaluated according to the other predicate based at least in part on the respective portions of the data read from the other one or more data blocks.

3. The system of claim 1, wherein to dynamically remove an existing query predicate from the one query predicate index, the dynamic predicate index generator is further configured to select the existing query predicate based at least in part a least recently used (LRU) or first-in-first out (FIFO) selection technique.

4. The system of claim 1, wherein the system is a compute node of a plurality of compute nodes that together comprises a cluster for storing the table as a part of a distributed data warehouse, wherein the table is maintained for the distributed data warehouse in columnar fashion, and wherein the distributed data warehouse is implemented as a network-based service.

5. A method, comprising:
performing, by one or more computing devices:
processing a first query to determine whether one or more storage locations of a data store for a table store data values of data records that satisfy one or more first query predicates of the first query, wherein the table comprises a plurality of storage locations, and individual ones of the storage locations persistently store data of multiple data records;
dynamically updating, in response to said processing of the first query, respective query predicate indexes for individual ones of the plurality of storage locations, wherein each of the respective query predicate indexes indicates that data values satisfying a set of one or more query predicates are not stored in a corresponding storage location as evaluated for one or more previous queries directed to the table, and wherein the dynamic updating includes:
in response to a determination that the first query includes a new query predicate that does not exist in one of the query predicate indexes, dynamically adding the new query predicate to the one query predicate index; and
in response to a determination that no space exists in the one query predicate index for the new query predicate, dynamically removing an existing query predicate from the one query predicate index;
receiving a query directed to the data store for select data from the table, wherein the query comprises at least one predicate to identify the select data;
in response to receiving the query:
evaluating the respective query predicate indexes for the individual ones of the plurality of storage locations with regard to the at least one predicate, wherein the at least one predicate corresponds to at least one of the set of one or more query predicates included in the query predicate indexes;
based at least in part on the evaluating, reducing a number of the plurality of storage locations to read in order to service the query; and
filtering data values of data records in the reduced number of storage locations according to the at least one predicate to generate a response to the query.

6. The method of claim 5, further comprising:
receiving another query directed to the data store for other select data from the table, wherein the other query comprises another one or more predicates that do not correspond to at least one of the one or more query predicates;
reading another one or more of the plurality of storage locations in order to service the other query; and
updating the respective query predicate indexes for the individual ones of the plurality of storage locations to include an indication that data values satisfying at least one of the other one or more predicates are not stored in the other one or more storage locations as evaluated according to the other predicate based at least in part on the respective portions of the data read from the other one or more storage locations.

7. The method of claim 5, wherein the removing of an existing query predicate from the one query predicate index comprises selecting the existing query predicate based at least in part a least recently used (LRU) or first-in-first out (FIFO) selection technique.

8. The method of claim 6, wherein the update of the respective query predicate indexes for the individual ones of the plurality of storage locations does not include an evaluation with respect to a particular one of the other one or more predicates.

9. The method of claim 5, further comprising:
receiving a write request to update the respective portion of the table at a specified one or more storage locations of the plurality of storage locations;
in response to receiving the write request, updating the respective query predicate indexes for the specified one or more of the plurality of storage locations to update the indication for the set of the one or more predicates according to the write request.

10. The method of claim 5, wherein the data store stores data according to a semi-structured data model.

11. The method of claim 5, wherein the table maintained as part of the data store is maintained for a relational database and wherein at least one of the one or more query predicates is directed toward a column of the table that is not included in another index for the table in the relational database.

12. The method of claim 5, wherein the query further comprises another predicate that does not correspond to at least one of the one or more query predicates included in the respective query predicate indexes.

13. The method of claim 5, wherein evaluating the respective query predicate indexes for the individual ones of the plurality of storage locations with regard to the at least one predicate comprises identifying the at least one query predicate included in the query predicate indexes as a query predicate that identifies a set of data values inclusive of data values identified by the at least one predicate in the query.

14. A non-transitory, computer-readable storage medium, storing program instructions that when executed by one or more computing devices cause the one or more computing devices to implement:
processing a first query to determine whether one or more storage locations of a data store for a table store data values of data records that satisfy one or more first query predicates of the first query, wherein the table comprises a plurality of storage locations, and individual ones of the storage locations persistently store
data of multiple data records;
dynamically updating, in response to said processing of
the first query, respective query predicate indexes for
individual ones of a plurality of storage locations,
wherein each of the respective query predicate indexes
indicates that data values satisfying a set of one or more
query predicates are not stored in a corresponding
storage location as evaluated for one or more previous
queries directed to the table, and wherein the dynamic
updating includes:
  in response to a determination that the first query
    includes a new query predicate that does not exist in
    one of the query predicate indexes, dynamically
    adding the new query predicate to the one query
    predicate index; and
  in response to a determination that no space exists in
    the one query predicate index for the new query
    predicate, dynamically removing an existing query
    predicate from the one query predicate index;
receiving a query directed to the data store for select data
  from the table, wherein the query comprises at least one
  predicate to identify the select data;
in response to receiving the query:
  evaluating the respective query predicate indexes for
    the individual ones of the plurality of storage loca-
    tions with regard to the at least one predicate,
    wherein the at least one predicate corresponds to at
    least one of the set of one or more query predicates
    included in the query predicate indexes;
  based at least in part on the evaluating, reducing a
    number of the plurality of storage locations to read in
    order to service the query; and
  filtering data values of data records in the reduced
    number of storage locations according to the at least
    one predicate to generate a response to the query.
15. The non-transitory, computer-readable storage
medium of claim 14, wherein the program instructions
further cause the one or more computing devices to imple-
ment:
  receiving another query directed to the data store for other
    select data from the table, wherein the other query
    comprises another predicate that does not correspond to
    one of the one or more query predicates;
  reading another one or more of the plurality of storage
    locations in order to service the other query; and
  updating the respective query predicate indexes for the
    individual ones of the plurality of storage locations to
    include an indication that data values satisfying the
    other predicate are not stored in the other one or more
    storage locations as evaluated according to the other
    predicate based at least in part on the respective por-
    tions of the data read from the other one or more
    storage locations.
16. The non-transitory, computer-readable storage
medium of claim 14, wherein, to remove an existing query
predicate from the one query predicate index, the program
instructions cause the one or more computing devices to
select the existing query predicate based at least in part a
least recently used (LRU) or first-in-first out (FIFO) selec-
tion technique.
17. The non-transitory, computer-readable storage
medium of claim 16, where the selection based, at least in
part, on a least recently used analysis of the one or more
query predicates.
18. The non-transitory, computer-readable storage
medium of claim 14, wherein evaluating the respective
query predicate indexes for the individual ones of the
plurality of storage locations with regard to the at least one
predicate, the program instructions cause the one or more
computing devices to implement:
  identifying a plurality of the one or more query predicates
    included in the query predicate indexes that when
    evaluated in combination identifies a set of data values
    inclusive of data values identified by the at least one
    predicate.
19. The non-transitory, computer-readable storage
medium of claim 14, wherein the plurality of storage loca-
tions correspond to respective data blocks of a block-based
persistent storage device, and wherein the respective query
predicate indexes comprises a bitmap, wherein each bit in
the bitmap corresponds to a particular one of the one or more
query predicates.
20. The non-transitory, computer-readable storage
medium of claim 14, wherein a b-tree index is implemented
for the plurality of storage locations of the table, wherein the
respective query predicate indexes for individual ones of the
plurality of storage locations are maintained at respective
branch locations in the b-tree index for the plurality of
storage locations, wherein evaluating the respective query
predicate indexes is performed as part of traversing the
b-tree index in order to service the query.

* * * * *